(12) United States Patent
Horner et al.

(10) Patent No.: US 9,815,010 B2
(45) Date of Patent: *Nov. 14, 2017

(54) WATER FILTRATION SYSTEM AND WATER FILTRATION SYSTEM HOUSING WITH CLOSING ASSEMBLY

(71) Applicant: ENPRESS L.L.C., Eastlake, OH (US)

(72) Inventors: Douglas M. Horner, Gates Mills, OH (US); Michael P. Mormino, Aurora, OH (US); Douglas S. Stolarik, Mentor, OH (US)

(73) Assignee: ENPRESS L.L.C., Eastlake, OH (US)

( * ) Notice: Subject to any disclaimer, the term of this patent is extended or adjusted under 35 U.S.C. 154(b) by 190 days.

This patent is subject to a terminal disclaimer.

(21) Appl. No.: 14/883,976

(22) Filed: Oct. 15, 2015

(65) Prior Publication Data

US 2016/0030866 A1    Feb. 4, 2016

Related U.S. Application Data

(62) Division of application No. 13/614,115, filed on Sep. 13, 2012, now Pat. No. 9,180,391.

(Continued)

(51) Int. Cl.
*B01D 35/30* (2006.01)
*B01D 65/00* (2006.01)
*B01D 63/06* (2006.01)
*B01D 63/10* (2006.01)
*C02F 1/00* (2006.01)
*C02F 1/44* (2006.01)

(52) U.S. Cl.
CPC ............ *B01D 35/30* (2013.01); *B01D 63/06* (2013.01); *B01D 63/10* (2013.01); *B01D 65/00* (2013.01); *C02F 1/001* (2013.01); *C02F 1/441* (2013.01); *B01D 2313/02* (2013.01); *B01D 2313/20* (2013.01); *C02F 2201/004* (2013.01); *C02F 2201/006* (2013.01); *Y10T 137/0402* (2015.04)

(58) Field of Classification Search
None
See application file for complete search history.

(56) References Cited

U.S. PATENT DOCUMENTS 5,720,411 A    2/1998  Darby et al.
6,641,717 B2 * 11/2003 Okano ................ B01D 29/603
                                                             116/274

(Continued)

*Primary Examiner* — Benjamin Kurtz
(74) *Attorney, Agent, or Firm* — Rankin, Hill & Clark LLP

(57) ABSTRACT

A water filtration system utilizes a housing configured to utilize various types of filter media and having a press-sealed closing system. The closing system includes a head portion defining a head opening, a lock member, and a lid member. The lock member releasably engages the head portion such that an abutment section of the lock member projects into the head opening. The lid member is received by the head portion to cover the head opening, and has an outward-facing press section configured to abut an inward facing portion of the abutment section of the lock member when the lid member is covering the head opening. Pressure generated within the housing during water filtration presses the lid member in an outward direction and causes the lid member press section to press against the abutment section of the lock member to substantially prevent disengagement of the lock member from the head portion.

17 Claims, 8 Drawing Sheets

Related U.S. Application Data

(60) Provisional application No. 61/534,872, filed on Sep. 14, 2011.

(56) References Cited

U.S. PATENT DOCUMENTS

| | | | |
|---|---|---|---|
| 9,180,391 B2* | 11/2015 | Horner | C02F 1/441 |
| 2003/0000879 A1* | 1/2003 | Snyder | A61L 2/10 |
| | | | 210/175 |
| 2005/0006393 A1 | 1/2005 | Carter | |
| 2005/0199536 A1 | 9/2005 | Koslow | |
| 2006/0060289 A1 | 3/2006 | Carter et al. | |
| 2006/0254975 A1* | 11/2006 | Wolf | B01D 29/21 |
| | | | 210/450 |
| 2006/0289546 A1 | 12/2006 | Carter | |
| 2009/0039009 A1 | 2/2009 | Stolarik et al. | |
| 2011/0192781 A1 | 8/2011 | Stokarik et al. | |

* cited by examiner

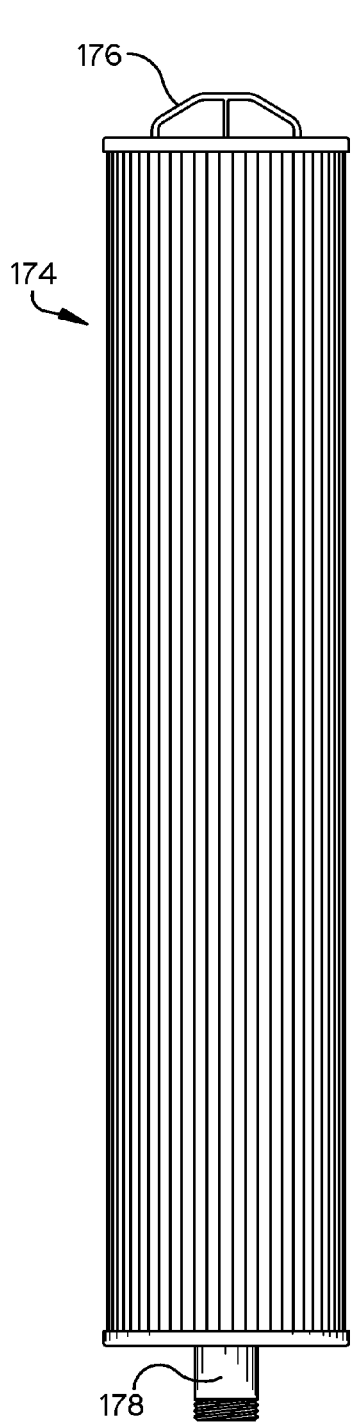
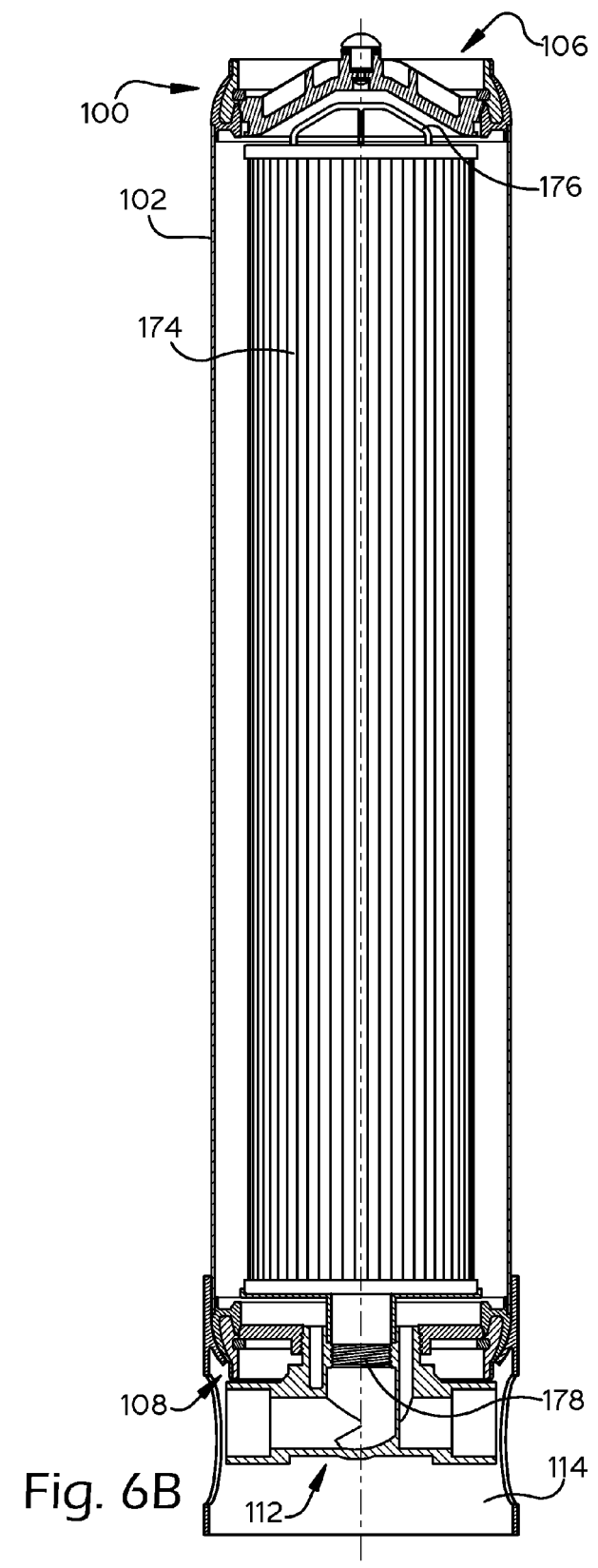
Fig. 6A
Fig. 6B

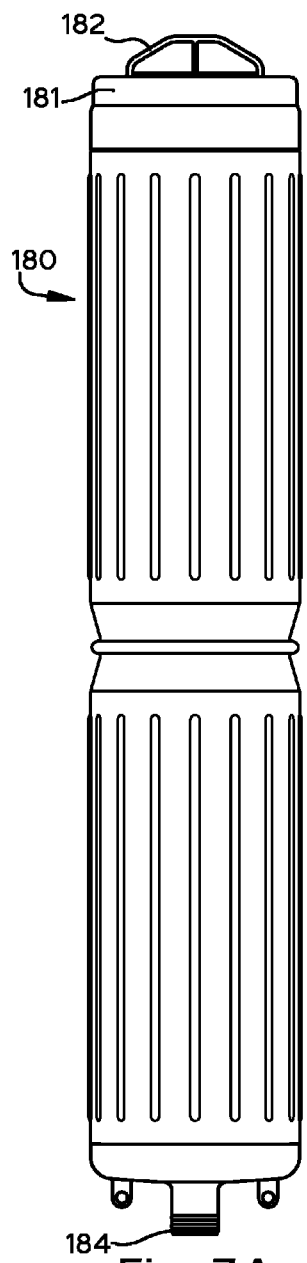
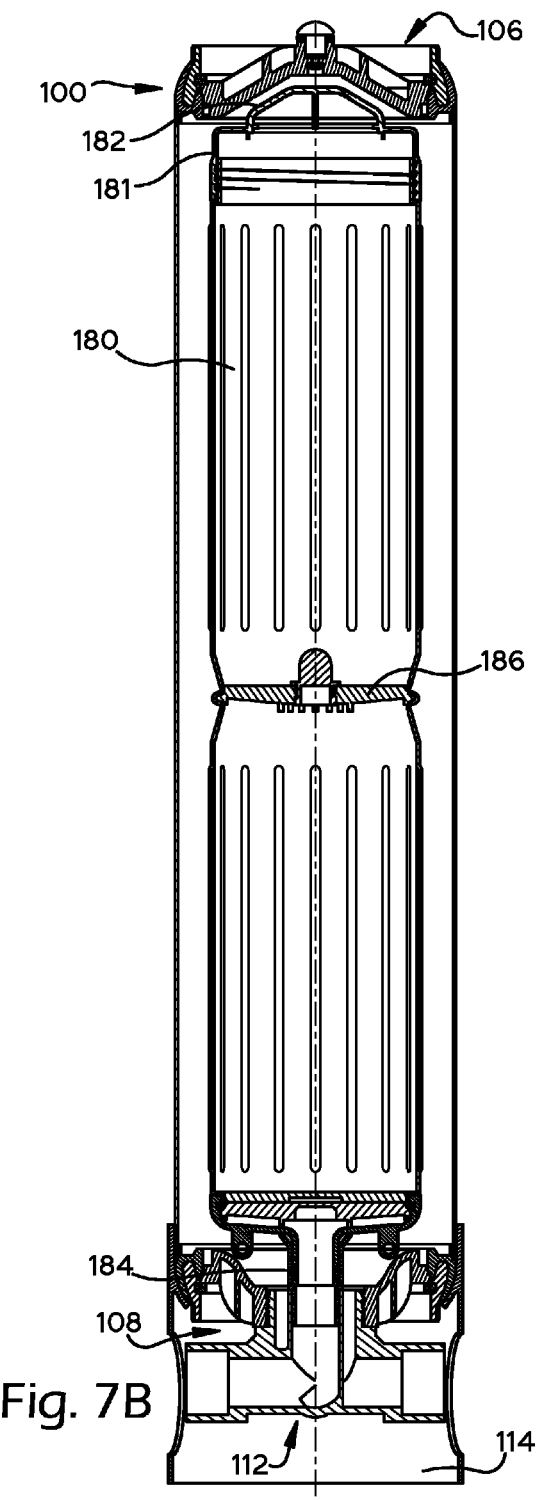
Fig. 7A
Fig. 7B

WATER FILTRATION SYSTEM AND WATER FILTRATION SYSTEM HOUSING WITH CLOSING ASSEMBLY

CROSS-REFERENCE TO RELATED APPLICATIONS

This application is a divisional of co-pending U.S. application Ser. No. 13/614,115, filed Sep. 13, 2012, and claims priority to U.S. provisional App. Ser. No. 61/534,872, filed Sep. 14, 2011.

BACKGROUND OF INVENTION

Field of Invention

The instant disclosure generally relates to a water filtration system housing and a water filtration system which utilizes the water filtration housing. More particularly, the instant disclosure relates to a water filtration housing including a pressure-sealed closing assembly, and a water filtration system using the water filtration housing.

Brief Description of Related Art

Water filtration is well known, and generally involves processing "raw" water through a filter media to remove solid particulates and/or dissolved components. The term "raw" denotes water that is to be filtered through a particular filter media. It will be appreciated that "raw" water may have been previously filtered or treated using another means or filtering system.

In some applications, water filtration media may be provided in the form of a cartridge, which is retained in a housing. Raw water must pass through the filter cartridge, which traps solids particulates and/or ions thereby rendering "treated" water. Filter cartridges can be made in many configurations, including but not limited to tubular membranes formed of pleated membrane material, containers that retain various forms of filtration media and tubular, spirally wound semi-permeable reverse osmosis membranes.

Regardless of the specific water filtration method used, the housing containing the operational filtration components may need to withstand substantial internal pressures generated during water filtration. The internal pressure may be generated due to a volume of water held within the housing, or as a consequence of the particular filtration method. To withstand the water filtration-generated pressures, housings may be formed of steel, which is both expensive and heavy, composite glass fiber-reinforced plastics, or high-strength plastics.

Inasmuch as the use of high-strength materials for the housing may provide one solution for handling the substantial internal pressure, certain water filtration applications may present design needs not adequately addressed by material-selection alone. Particularly, certain water filtration applications, such as point of entry, in-home or local water filtration, may require periodic access to an interior of the housing for maintenance, such as to replace a filter cartridge. For these applications, a housing which is capable of both handling the substantial internal pressures associated with water filtration and providing access to an interior of the housing (e.g., to a filter cartridge) is needed.

Furthermore, certain water filtration applications may benefit from using more than one filtration method, with more than one filter media. The different filtration methods may be serially provided such that the raw water passes through each filtration method in sequence. However, assembling a multi-filtration-method water filtration system may require advanced planning and a specialized configuration of the system. The advanced planning and specialized configuration may add cost and introduce inefficiency to the assembly of the multi-filtration-method water filtration system. Additionally, even for single-filtration-method systems, a particular housing associated with the filtration method to be applied may need to be provided. Acquiring, storing, and transporting (e.g., to a job site) various different housings may be inconvenient for filtration system installers, but may be necessary to allow the installers to assemble appropriate filtration systems.

BRIEF SUMMARY OF THE INVENTION

According to one aspect, a pressure-sealed closing system is provided for a water filtration housing. The water filtration housing has a head portion with an inner surface which defines a head opening, and the head portion is configured to be joined to a first end of a hollow body of the water filtration housing such that the head opening communicates with an interior of the hollow body. The system includes a lid member and a lock member. The lid member has a press section, and is configured to be removably received by the head portion to cover the head opening with the press section facing an outward direction relative to the interior of the body. The lock member is configured to releasably engage the head portion such that an abutment section of the lock member projects from the head portion into the head opening. The lock member has an inner portion forming the abutment section and an outer portion configured to be received in an indent defined in the head portion inner surface so as to engage the head portion. A pressure generated within the housing during water filtration presses the lid member in the outward direction and causes the press section to press against the abutment section, thereby pressure sealing the housing at the head opening.

According to another aspect, a housing is provided for a water filtration system. The housing includes a body, a first lid member, and a first lock member. The body includes a first head portion provided at a first end thereof. The first head portion has an inner surface which defines a first head opening that communicates with an interior of the body. The first lid member is removably received by the first head portion to cover the first head opening, and has a first press section which faces an outward direction relative to the interior of the body. The first lock member releasably engages the first head portion such that a first abutment section of the first lock member projects from the first head portion into the first head opening. The first lock member has an inner portion forming the first abutment section and an outer portion received in an indent defined in the first head portion inner surface so as to engage the first head portion. A pressure generated within the housing during water filtration presses the first lid member in the outward direction and causes the first press section to press against the first abutment section, thereby pressure sealing the housing at the first head opening.

The housing can be used in a variety of applications and can contain a variety of different types of filtration cartridges. Thus, an installer can maintain an inventory of housings, filtration cartridges and heads, and can readily assemble the appropriate filtration system using the desired components.

According to still another aspect, a water filtration system is provided. The water filtration system includes a first housing, a second housing, a first filter media, and a second filter media. The first housing includes a body, a lid member, and a lock member. The body includes a head portion provided at an end thereof. The head portion has an inner surface which defines a head opening that communicates with an interior of the body. The lid member is removably received by the head portion to cover the head opening, and has a press section which faces an outward direction relative to the interior of the body. The lock member releasably engages the head portion such that an abutment section of the lock member projects from the head portion into the head opening. The lock member has an inner portion forming the abutment section and an outer portion received in an indent defined in the head portion inner surface so as to engage the head portion. A pressure generated within the first housing during water filtration presses the lid member in the outward direction and causes the press section to press against the abutment section, thereby pressure sealing the first housing at the head opening. The second housing is identical to the first housing and in communication with the first housing. The first filter media is received in the first housing, and the second filter media received in the second housing. The second filter media is different from the first filter media.

According to still another aspect, a method for assembling a multi-filtration-method water filtration system is provided. The method includes providing a first filter media in a first housing, engaging a first liquid communicating device with the first housing, providing a second filter media in a second housing, engaging a second liquid communicating device with the second housing lid member, and connecting an input of the first liquid communicating device to a water supply line, connecting an output of the first liquid communicating device to an input of the second liquid communicating device, and connecting an output of the second liquid communicating device to a system output line. The first housing includes a body, a lid member, and a lock member. The first housing body includes a head portion provided at an end thereof, the head portion having an inner surface which defines a head opening that communicates with an interior of the body. The first housing lid member is removably received by the head portion to cover the head opening, and has a press section which faces an outward direction relative to the interior of the body. The first housing lock member releasably engages the head portion such that an abutment section of the lock member projects from the head portion into the head opening. The first housing lock member has an inner portion forming the abutment section and an outer portion received in an indent defined in the head portion inner surface so as to engage the head portion. A pressure generated within the first housing during water filtration presses the lid member in the outward direction and causes the press section to press against the abutment section, thereby pressure sealing the first housing at the head opening. The second housing includes a body, a lid member, and a lock member. The second housing body includes a head portion provided at an end thereof, the head portion having an inner surface which defines a head opening that communicates with an interior of the body. The second housing lid member is removably received by the head portion to cover the head opening, and has a press section which faces an outward direction relative to the interior of the body. The second housing lock member releasably engages the head portion such that an abutment section of the lock member projects from the head portion into the head opening. The second housing lock member has an inner portion forming the abutment section and an outer portion received in an indent defined in the head portion inner surface so as to engage the head portion. A pressure generated within the second housing during water filtration presses the lid member in the outward direction and causes the press section to press against the abutment section, thereby pressure sealing the second housing at the head opening.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

BRIEF DESCRIPTION OF THE DRAWINGS

FIG. 6A is a front view of an exemplary filter cartridge for use with the exemplary water filtration system.

FIG. 6B is a sectional view illustrating the filter cartridge shown in FIG. 6A received in the exemplary water filtration system housing.

FIG. 7A is a sectional view illustrating an exemplary filter casing for use with the exemplary water filtration system.

FIG. 7B is a sectional view illustrating the filter casing shown in FIG. 7A received in the exemplary water filtration system.

DETAILED DESCRIPTION OF THE INVENTION

Figure 1:
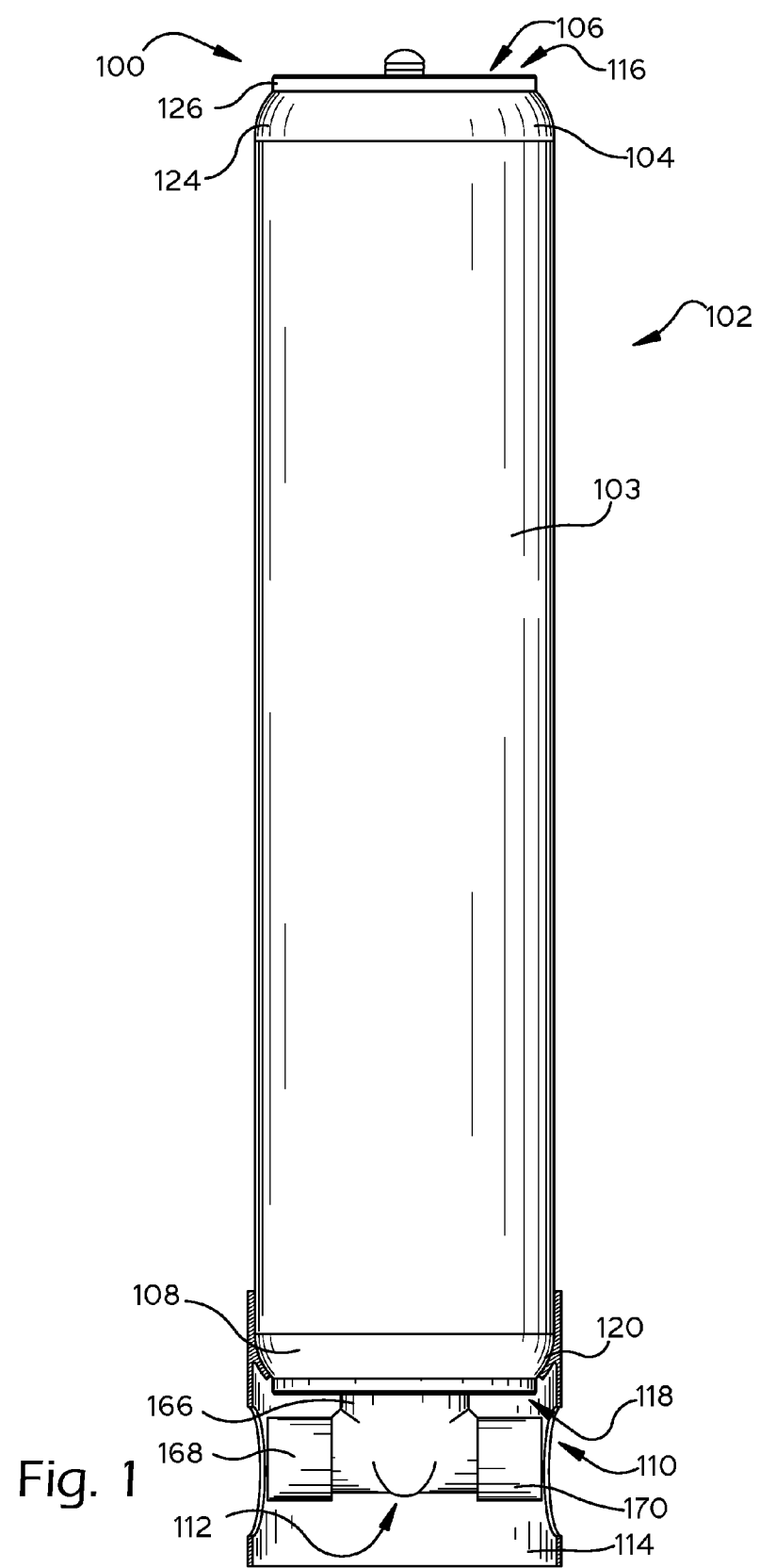
FIG. 1 is a front view of an exemplary water filtration system according to the instant disclosure.

The description and drawings herein are merely illustrative, and various modifications and changes can be made in the structures disclosed without departing from what is defined in the appended claims. All references to direction and position, unless otherwise indicated, refer to the orientation of the structures and components illustrated in the drawings and should not be construed as limiting the claims appended hereto. Like numbers refer to like parts throughout the several views.

FIG. 1 shows an exemplary water filtration system 100 (hereinafter, "system 100") which is configured for a point of entry, in-home water filtration application employed using a filter cartridge or casing-based filtration process. The system 100 includes a housing 102 having a body 103 with a first or upper head portion 104 which is closed and pressure sealed by a first or upper closing assembly 106 and a second or lower head portion 108, opposite from the first head portion 104, which is closed and pressure sealed by a second or lower closing assembly 110. Each closing assembly 106, 110 cooperates with the associated head portion 104, 108 to form a pressure-sealed closing system, as is described in further detail below. The system 100 also includes a T-pipe 112 communicating an interior of the housing 102 with external water lines (not shown), and a support stand 114 on which the housing 102 rests.

It is to be appreciated that, though not illustrated in FIG. 1, the housing 102 is provided to house various operational water filtration components, such as a water filter cartridge ("filter cartridge"). It is also to be appreciated that the herein described housing 102 and closing assemblies 106, 110 are amenable for use with any manner of water filtration process. Moreover, the various water filtration processes, including that/those associated with the exemplarily illustrated system 100, are considered to be known in the art, and as such the process(es) and the particular internal components used therewith, will not be described in detail in the instant application. For ease of understanding, the system 100 and the housing 102 will be described with reference to the exemplary filter cartridge-based filtration process.

The housing body 103 is a hollow, cylindrical member formed of a polymeric material, which is overwrapped and reinforced with glass-fiber filaments in a winding process. The body 103 is sized to fit the operational water filtration components, including the filter cartridge, as well as a sufficient quantity of water to allow for water filtration to be carried out and to supply the required or desired quantity of filtered water. More particularly, the body 103 has a height and diameter which are greater than that of the filter cartridge to be housed therein. The walls defining the body 103 may be thin relative to an interior space defined thereby.

As a hollow, cylindrical member, the body 103 defines a first or upper circular body opening at an upper end and a second or lower circular body opening at a lower end. The upper and lower ends of the body 103 are capped by the upper head portion 104 and the lower head portion 108, respectively. The upper and lower head portions 104, 108 are each generally annular members configured to be attached to the respective upper and lower ends of the body 103. As a generally annular member, an inner surface of the upper head portion 104 defines a first or upper head opening 116 which communicates and is concentrically provided with the upper body opening. Similarly, the inner surface of the generally annular lower head portion 108 defines a second or lower head opening 118 which communicates and is concentrically provided with the lower body opening. For the purposes of this description, the upper head opening 116 and upper body opening will collectively be referenced as the "upper head opening 116", and the lower head opening 118 and the lower body opening will be collectively referenced as the "lower head opening 118". Both the upper head opening 116 and the lower head opening 118 may have a circular shape when viewed from above and below in FIG. 1.

The upper head portion 104 and the lower head portion 108 are advantageously joined to the body 103 via spin-welding. However, other bonding processes can be used. Furthermore, the housing 102 may be formed as, or include features, described in U.S. patent application Ser. No. 12/703,464, filed on Feb. 10, 2010.

Figure 2:
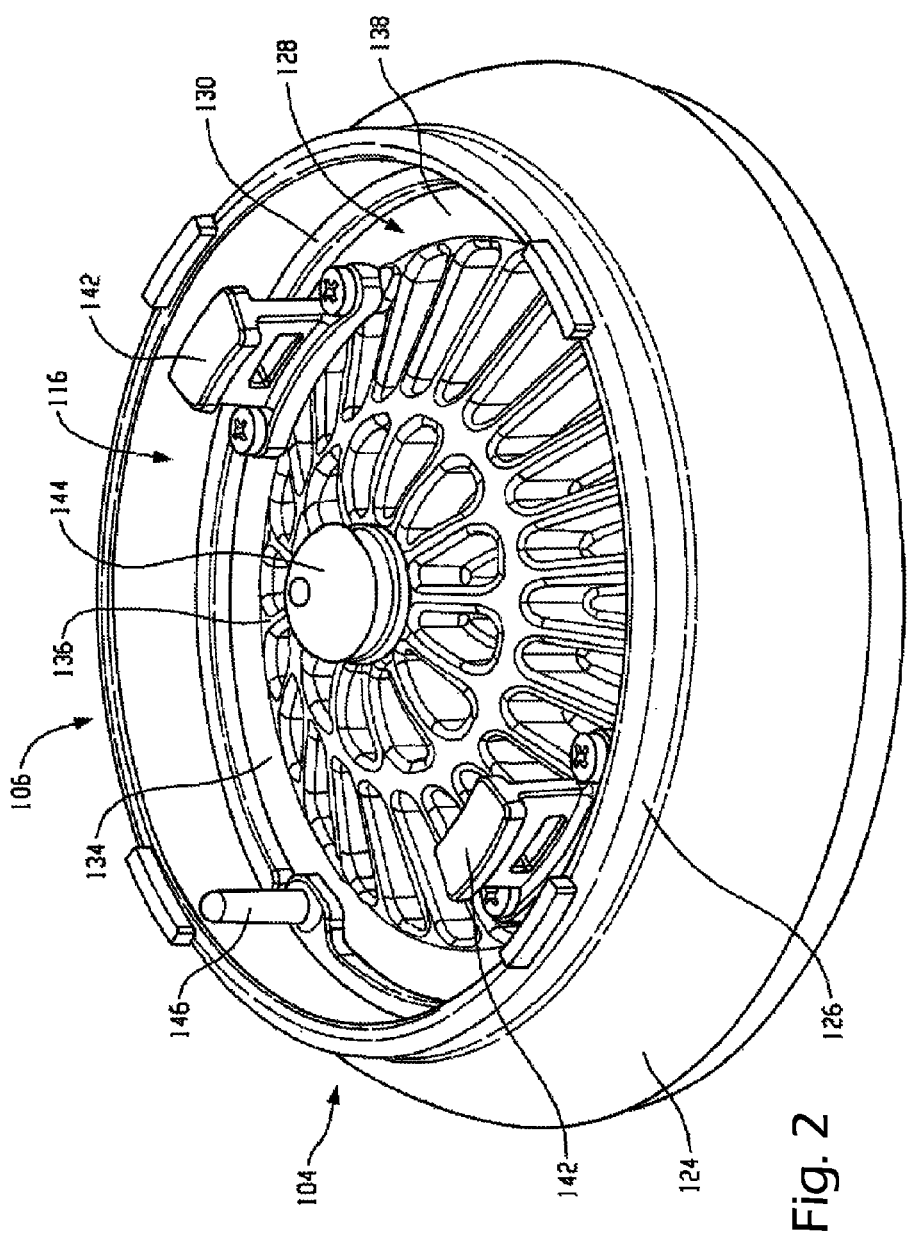
FIG. 2 is a perspective view illustrating an upper housing end and upper lid member of the exemplary water filtration system.
Figure 3:
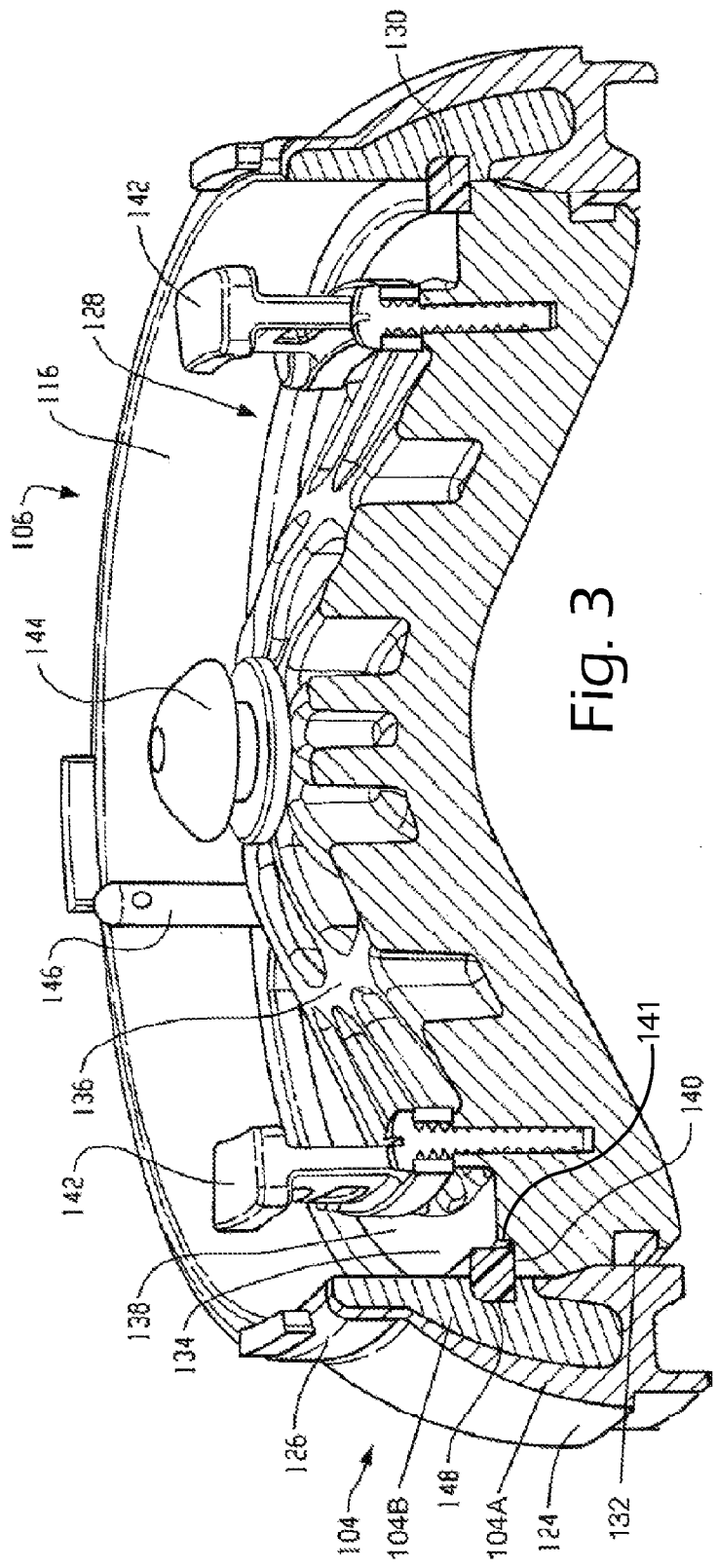
FIG. 3 is a sectional view illustrating the upper housing end and upper lid member of the exemplary water filtration system.

With reference to FIGS. 2 and 3, the upper head portion 104 includes a bulbous proximal section 124 having a lower end configured to be attached to an upper end of the body 103, and a distal section 126 spaced from the bulbous proximal section 124 along a taper such that the distal section 126 defines an outer diameter less than that of the proximal section 124. The taper provides a mechanical gripping surface for filaments wound over the upper head portion 104 and the body 103. The lower head portion 108 is joined to the body 103 in the same manner, and features the same tapered contour and reinforcing filaments 188 (see FIG. 5).

The upper head portion 104 is formed of an outer barrel portion 104A and an inner collar portion 104B. The outer barrel portion 104A may be formed of a thermoplastic polymer, such as polypropylene or another olefinic thermoplastic polymer or copolymer that will readily bond with the body 103. The inner collar portion 104B may be formed of a fiber-reinforced polymer, which need not be thermoplastic. For example, the inner collar portion 104B may be formed of a glass-fiber filled olefinic polymer or copolymer (e.g., polypropylene).

The upper head portion 104 may be formed by overmolding the outer barrel portion 104A onto the inner collar portion 104B such that the outer barrel portion 104A at least partially covers an outer side of the inner collar portion 104B. The term "overmolded", as used herein, means that the outer barrel portion 104A has been bonded to the inner collar portion 104B by a molding process in which a molten polymer used to form one of the outer barrel portion 104A or the inner collar portion 104B is injected into a mold containing the other of the outer barrel portion 104A or the inner collar portion 104B (or a precursor thereof). Furthermore, it is also possible to overmold a thermoplastic precursor with a fiber-reinforced polymer (or vice-versa) to form a blank, and then remove material from the blank to form the upper head portion 104. The lower head portion 108 may be formed by the same overmolding process.

As noted above, the upper head portion 104 may be joined to the body 103 by spin-welding. In this regard, the outer barrel portion 104A is formed of a material which will readily bond with the body 103 during spin-welding. Once spin-welded together, the upper head portion 104 and the body 103 have glass-fiber filaments wound therearound for strength. As will be apparent with reference to the below description, the inner collar portion 104B may benefit from being formed of a more rigid material so as to support the upper closing assembly 106.

With reference to the upper head opening 116, it is noted that the inner surface of the upper head portion 104 defines the upper head opening 116. As shown in FIG. 3, an outward portion of the inner surface of the upper head portion 104 is formed of the inner collar portion 104B, while an inward portion of the inner surface of the upper head portion 104 is formed of the outer barrel portion 104A. Further, the inner collar portion 104B (i.e., the outward portion of the upper head portion 104) defines a substantially uniform diameter and circumference, while the outer barrel portion 104A (i.e., the inward portion of the upper head portion 104) defines an inwardly tapering diameter and circumference. The diameter of the upper head opening 116 may be the same as the diameter of the lower head opening 118. However, it will be appreciated that the diameter of the upper head opening 116 can be greater or less than that of the lower head opening 118, if desired. It is also noted that the lower head portion 108 may be formed in an identical manner to the upper head portion 104.

With further reference to FIGS. 2 and 3, the upper closing assembly 106, which closes and pressure seals the housing 102 at the upper head opening 116, includes a first or upper lid member 128 and a first or upper lock member 130. The upper lid member 128 may be an injection molded plastic body, define a generally circular shape when viewed from above in FIG. 1, and have an outer diameter which corresponds to that of the inner diameter of the upper head portion 104 (i.e., the diameter of the upper head opening 116). More particularly, a lateral outer surface of the upper lid member 128 has a maximum diameter at an outward (upward in FIG. 3) portion thereof, with an inwardly-tapered inward (downward in FIG. 3) portion defining a lesser diameter. The maximum diameter of the lateral outer surface of the upper lid member 128 is greater than the diameter defined by the tapered part of the outer barrel portion 104A. Accordingly, when the upper lid member 128 is placed in the upper head opening 116, the outward portion of the upper lid member 128 contacts the inward portion of the upper head portion 104 and is prevented from passing thereby. As such, a maximum depth at which the upper lid member 128 may be received within the upper head portion 104 and the body 103 is set.

The upper lid member 128 is formed of an outer annular section 134 integrated with an inner dome section 136. The outer annular section 134 includes an upper or outward-facing surface 138 which is substantially parallel to a plane of the upper head opening 116, and defines a lid indent formed of a substantially horizontally oriented press section 140 which extends around an outer circumferential periphery of the outer annular section upper surface 138, and a vertically oriented safety ledge 141 disposed at an inner radial edge of the press section 140. The press section 140 is an outward/upward facing surface of the lid member 128 which is horizontally oriented. The upper lid member 128 may also include an o-ring receiving indent 132 formed as an annular indent along an inward (lower) portion of the lateral outer surface of the upper lid member 128. The provision of an o-ring may facilitate the sealing of the upper head opening 116 by the upper lid member 128.

The inner dome section 136 protrudes in an upward direction, away from the body 103, to an apex which is centrally disposed relative to the upper head opening 116. The outer annular section 134 and inner dome section 136 may be integrally formed such that the upper lid member 128 constitutes a single, unitary piece (as illustrated). It is noted that, as used herein, the term outward refers to an up or down direction in FIG. 1 and is referenced with respect to a center of the housing in the up/down direction (i.e., outward is up with reference to the upper closing assembly 106 and down with reference to the lower closing assembly 110).

The upper lid member 128 may be provided with a pair of handles 142 secured thereto via securing means. The handles 142 are configured to vertically extend from the upper lid member 128 so as to provide a gripping or leverage point for a user trying to place or remove the upper lid member 128. As illustrated, the securing means may be screws driven into the upper lid member 128. However, it is to be appreciated that any other suitable securing means may be used in place of the screws.

A pressure release mechanism 144 is provided as a selectively actuatable pressure release button on the apex of the upper lid member inner dome section 136. In this regard, an opening may be defined through the apex of the first lid member inner dome section 136 so as to communicate with an interior of the housing 102. The pressure release mechanism 144 is provided within this opening so as to protrude upwardly therefrom. In a base state (shown in FIGS. 2 and 3) the pressure release mechanism 144 closes and seals the opening defined through the apex of the upper lid member inner dome section 136. The pressure release mechanism 144 may be actuated by pressing downwardly or inwardly thereon so as to open the opening and allow pressure within the housing 102 to be released. Pressure release mechanisms of this type are considered to be known in the art, and will therefore not be described in detail herein. It is to be appreciated that the illustrated pressure release mechanism 144 is merely exemplary, and may be replaced using any other known mechanism for releasing pressure within the housing 102 which is suitable for this application, including those which may be provided on any other portion of the housing 102, the upper closing assembly 106 or the lower closing assembly 110. It is also to be appreciated that the pressure release mechanism 144 may alternatively or additionally be provided on the housing 102 and/or on a lower lid member 150.

Upon release of pressure from within the housing 102, water may be forced out of the housing 102 through the opening defined through the apex of the upper lid member inner dome section 136 or through the pressure release mechanism 144. The inner dome section 136 has a plurality of reservoirs defined in an outward facing surface thereof which may be concentrically arranged to surround the apex so as to receive and temporarily hold the water exiting the housing 102 during pressure release. Alternatively, a single moat-type reservoir may be defined in the any part of the upper lid member 128, and/or the plurality of reservoirs may be provided on the outer annular section 134 as well.

The upper lock member 130 is an incomplete annular or ring-shaped body provided with a handle 146. The upper lock member 130 has a generally circular base shape when viewed from above in FIG. 1. As the upper lock member 130 has an incomplete ring-shape, the upper lock member 130 may be deformed from the generally circular shape so as to facilitate releasable engagement with and disengagement from the upper head portion 104, as will be described in further detail below. In this regard, the handle 146 is provided to facilitate deformation of the upper lock member 130.

With reference to FIG. 3, a head indent 148 is defined in the inner surface of the upper head portion 104. The head indent 148 extends along an entire circumference of the inner surface of the upper head portion 104 at a generally intermediate vertical position of the upper head portion 104, and may be defined entirely in the inner collar portion 104B. An inner, vertically-oriented surface of the head indent 148 defines a diameter and circumference greater than an inner diameter and circumference of the upper head portion 104 (i.e., the upper head opening 116). A height of the head indent 148 is substantially equal to, or slightly greater than, a height of the upper lock member 130 such that a portion of the upper lock member 130 can be received within the head indent 148 so as to engage the upper lock member 130 with the upper head portion 104. It is noted that the inner collar portion 104B is formed to be stronger and/or more rigid than the outer barrel portion 104A. As such, by defining the head indent 148 in the inner collar portion 104B, the upper lock member 130 may engage the upper head portion 104 at a more rigid and secure portion.

With further reference to the upper lock member 130, an outer circumference thereof is substantially equal to, or slightly less than, the inner circumference of the head indent 148 at the inner, vertically-oriented surface. Furthermore, a width of the upper lock member 130 (defined herein as a length between an outer circumferential surface and an inner circumferential surface) may be substantially equal to a sum of a width of the head indent 148 and a width of the press section 140.

As noted, the upper lock member 130 is configured to releasably engage the upper head portion 104. In this regard, an inner circumferential portion (inner portion) of the upper lock member 130 forms an abutment section and an outer circumferential portion (outer portion) of the upper lock member 130 is configured to engage the upper head portion 104 by being received within the head indent 148. The abutment section of the upper lock member 130 may be defined as the portion of the upper lock member 130 which protrudes into the upper head opening 116 from the head indent 148 when the upper lock member 130 engages the upper head portion 104. As will be discussed in further detail below, an inward facing portion of the abutment section of the upper lock member 130 is configured to abut the outward facing press section 140 of the upper lid member 128.

The upper closing assembly 106 closes and pressure seals the upper head opening 116 by placing the upper lid member 128 within the upper head portion 104 so as to fully cover the upper head opening 116. The upper lid member 128 may contact the tapered inner surface of the upper head portion 104 defined by the outer barrel portion 104A. In this condition, when the housing 102 is not pressurized during water filtration, the upper lid member 128 contacts and is held by the tapered inner surface of the upper head portion 104 such that the press section 140 of the upper lid member 128 is at a rest height. The upper lock member 130 is then deformed and received within the head indent 148 so as to protrude therefrom into the upper head opening 116 (i.e., the upper lock member 130 engages the upper head portion 104) at a position adjacent to, but which may be spaced from (in the outward direction), the outward facing press section 140 of the lid member 128.

Once the system 100 is operable (i.e., water filtration begins), the pressure generated within the housing 102 during water filtration presses the upper lid member 128 outwardly (upperwardly) such that the press section 140 moves in the outward direction and presses the abutment section of the upper lock member 130. This pressing causes the upper lock member 130 to press into an upper surface of the head indent 148. The upper lid member 128 is pressed into the upper lock member 130 with a force sufficient to make disengagement of the upper lock member 130 from the upper head portion 104 extremely difficult or impossible. More particularly, the press section 140 of the upper lid member 128 is caused by pressure within the housing 102 to press the abutment section of the upper lock member 130 with a force sufficient to substantially prevent the upper lock member 130 from being deformed, and thereby preventing the upper lock member 130 from disengaging the upper head portion 104.

The upper lock member 130 is thereby wedged between the upper lid member 128 and the head indent 148 with such a force that deformation of the upper lock member 130 is made very difficult, if not impossible, for a human user (or a machine controller, if applicable). In this regard, it is noted that the upper lid member 128 may be received within the upper head portion 104 so as to be movable over a relatively small vertical range. The base positions of the upper lid member 128 and the lock member 130 (including the head indent 148) when the housing 102 is not pressurized are such that the outward force exerted on the upper lid member 128 as a result of internal pressures typical for the applied water filtration process is sufficient to cause the upper lid member 128 to press into the upper lock member 130 with the force sufficient to substantially prevent deformation of the upper lock member 130 (and therefore also to prevent disengagement from the upper head portion 104). Moreover, as the head indent 148 is formed in the relatively more rigid inner collar portion 104B, the upper head portion 104 is better equipped to handle the pressures exerted thereon by the upper closing assembly 106 (i.e., the upper lock member 130 via the upper lid member 128).

Despite the pressure making deformation of the upper lock member 130 difficult, the pressure-sealed closing system still provides safety mechanisms to help ensure that the upper lock member 130 does not disengage from the upper head portion 104 when the housing 102 is pressurized during water filtration. In this regard, the handle 146 may be provided with a reduced-strength portion which is configured to fail (e.g., break or otherwise deform) upon exertion of a predetermined force on the handle 146. The reduced-strength portion may be formed such that the predetermined force is a force less than that required to deform and/or disengage the upper lock member 130 from the upper head portion 104 when the housing 102 is pressure sealed. Accordingly, if a force sufficient to cause the upper lock member 130 to deform is applied to the handle 146 while the housing 102 is pressure sealed, the handle 146 will fail (e.g., break), thereby preventing deformation and/or disengagement of the upper lock member 130.

Furthermore, as noted above, the upper lid member 128 is provided with the safety ledge 141, which is disposed at the inner radial edge of the press section 140. The safety ledge 141 is formed such that, when the housing 102 is pressure sealed with the press section 140 pressing against abutment section of the upper lock member 130, the safety ledge 141 prevents deformation and disengagement of the upper lock member 130. Specifically, an attempted deformation of the upper lock member 130 will cause an inner edge of the upper lock member 130 to abut against the safety ledge 141, thereby preventing further deformation of the upper lock member 130. Accordingly, even if the upper lock member 130 is forcibly moved to deform while the housing 102 is pressure sealed, the upper lock member 130 cannot be deformed and disengaged from the upper head portion 104.

To disengage the upper lock member 130 from the upper head portion 104, the housing 102 must be depressurized (i.e., by actuating the pressure release mechanism 144). Once depressurized, the upper lid member 128 is lowered within the upper head portion 104 such that the press section 140 is at the rest height. The safety ledge 141 is formed such that, when the press section 140 is at the rest height, the upper lock member 130 is not prevented from deforming or disengaging from the upper head portion 104 by the safety ledge 141. That is, the safety ledge 141 is formed to have a height such that, when the press section 140 is at the rest height, an upper/outward end of the safety ledge 141 is disposed substantially inwardly/downwardly from the abutment section of the lock member 130, so that the upper lock member 130 may be deformed without abutting or being blocked by the safety ledge 141.

Accordingly, when the system 100 is operational and the housing 102 is pressurized, the upper lock member 130 cannot be deformed, and the upper lid member 128 and upper lock member 130 cannot be removed. This state is herein referenced as a "pressure sealed" state (i.e., the upper lid member 128, upper lock member 130, and upper head portion 104 cooperate to pressure seal the housing at the upper head opening 116). To remove the upper lock member 130, the pressure release mechanism 144 must be actuated to release the pressure within the housing 102. Once the pressure is released, the pressure seal is released (i.e., the pressing on the upper lock member 130 by the upper lid member 128 is relieved), the upper lid member 128 is lowered such that the press section 140 nears the rest height, and the upper lock member 130 may be deformed and removed.

Figure 4:
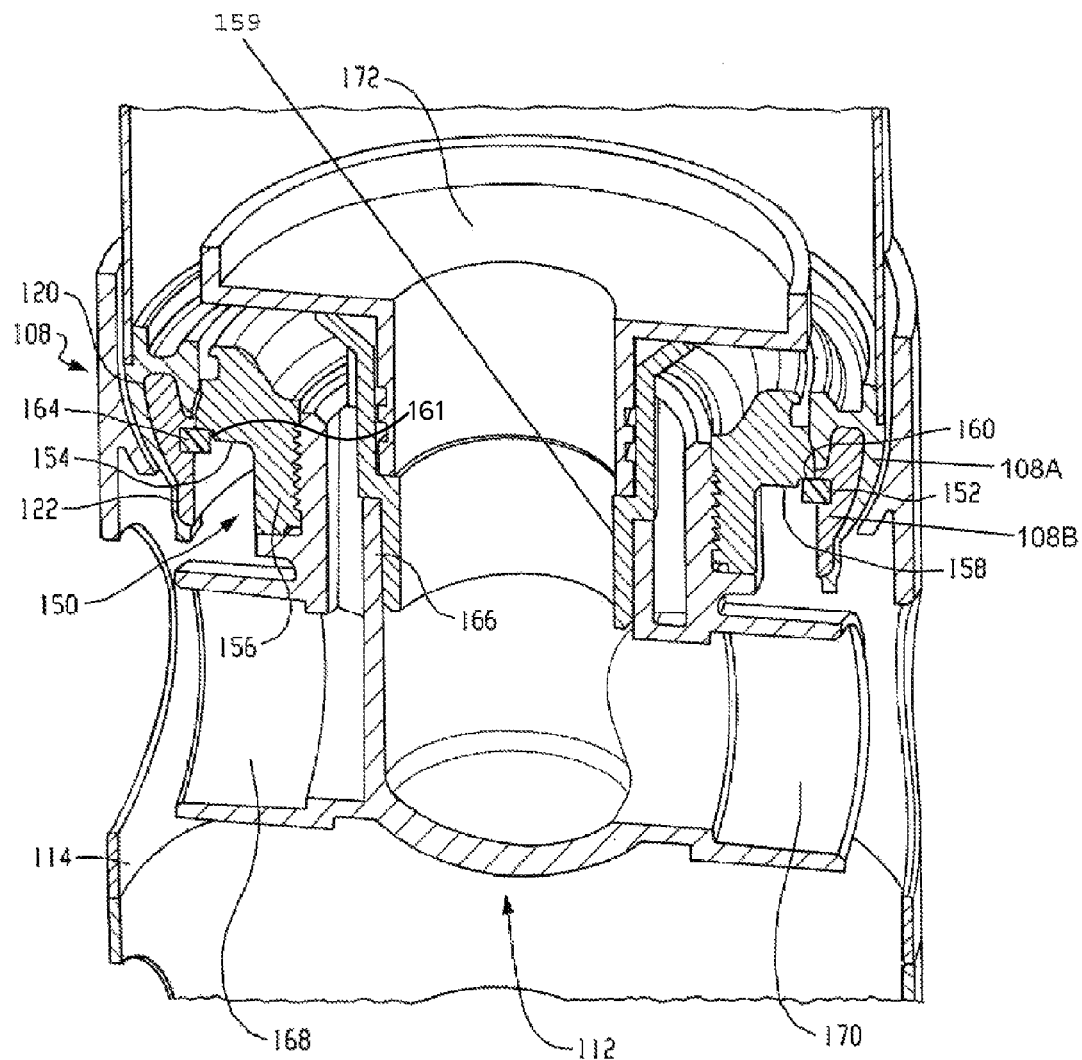
FIG. 4 is a sectional view illustrating a lower housing end and lower lid member of the exemplary water filtration system.
Figure 5:
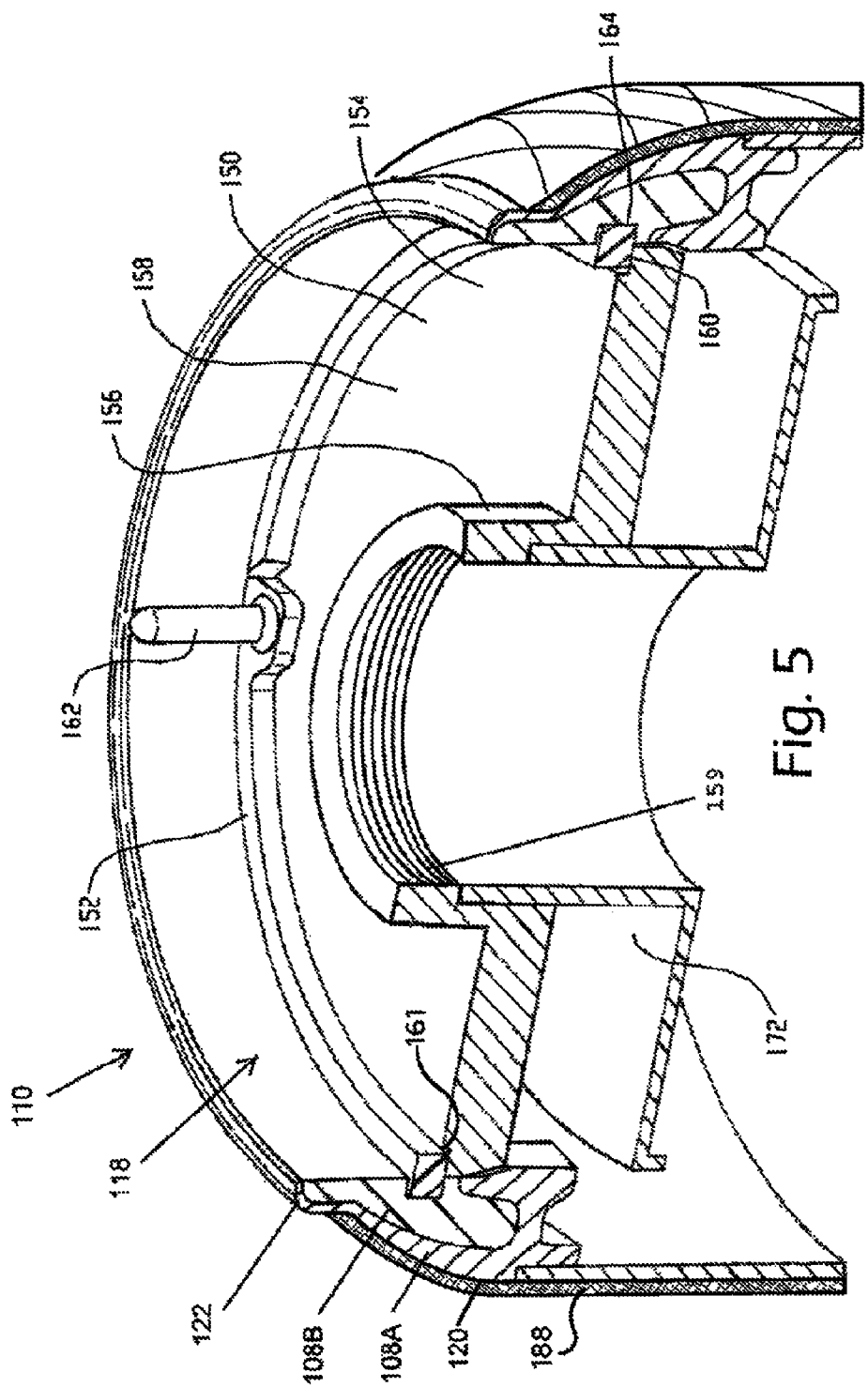
FIG. 5 is a sectional view illustrating the lower housing end and lower lid member of the exemplary water filtration system.

With reference to FIGS. 4 and 5, it is noted that the lower head portion 108 may be formed in a substantially similar manner to the upper head portion 104. In this regard, the lower head portion 108 may include a lower bulbous proximal section 120 having an upper end configured to be attached to a lower end of the body 103, and a lower distal section 122 spaced from the lower bulbous proximal section 120 along a taper such that the lower distal section 122 defines an outer diameter less than that of the lower proximal section 120. As with the upper head portion 104, the taper of the lower head portion 108 provides a mechanical gripping surface for the filaments 188 wound over the lower head portion 108 and the body 103.

Furthermore, the lower head portion 108 is formed of an outer barrel portion 108A and an inner collar portion 108B. The outer barrel portion 108A may be formed of a thermoplastic polymer, such as polypropylene or another olefinic thermoplastic polymer or copolymer that will readily bond with the body 103. The inner collar portion 108B may be formed of a fiber-reinforced polymer, which need not be thermoplastic. For example, the inner collar portion 108B may be formed of a glass-fiber filled olefinic polymer or copolymer (e.g., polypropylene). The lower head portion 108, including the outer barrel portion 108A and the inner collar portion 108B, are formed of the same or similar materials and in the same manner as the upper head portion 104 (i.e., overmolded). Additionally, the lower head portion 108 may be joined to the body 103 by spin-welding. In this regard, the outer barrel portion 108A is formed of a material which will readily bond with the body 103 during spin-welding. Once spin-welded together, the lower head portion 108 and the body 103 have glass-fiber filaments wound therearound for strength. As will be apparent with reference to the below description, the inner collar portion 108B may benefit from being formed of a more rigid material so as to support the lower closing assembly 110.

With reference to the lower head opening 118, it is noted that the inner surface of the lower head portion 108 defines the lower head opening 118. As shown in FIG. 5, an outward portion of the inner surface of the lower head portion 108 is formed of the inner collar portion 108B, while an inward portion of the inner surface of the lower head portion 108 is formed of the outer barrel portion 108A. Further, the inner collar portion 108B (i.e., the outward portion of the lower head portion 108) defines a substantially uniform diameter and circumference, while the outer barrel portion 108A (i.e., the inward portion of the lower head portion 108) defines an inwardly tapering diameter and circumference.

With further reference to FIGS. 4 and 5, the lower closing assembly 110, which closes and pressure seals the housing 102 at the lower head opening 118, includes a second or lower lid member 150 and a second or lower lock member 152. The lower lid member 150 may be an injection molded plastic body, define a generally circular shape when viewed from below in FIG. 1, and have an outer diameter which corresponds to (i.e., is substantially equal to or slightly less than) the inner diameter of the lower head portion 108 (i.e., the diameter of the lower head opening 118). The lower lid member 150 is sized to be received in the lower head portion 108 so as to close the lower head opening 118, and has a maximum diameter greater than the diameter defined by the tapered part of the outer barrel portion 108A.

Accordingly, when the lower lid member 150 is placed in the lower head opening 118, the outward portion of the lower lid member 150 contacts the inward portion of the lower head portion 108 and is prevented from passing thereby. As such, a maximum depth at which the lower lid member 150 may be received within the lower head portion 108 and the body 103 is set. As will be described in further detail below, the lower lock member 152 sets a depth at which the lower lid member 150 is received within the lower head portion 108 and the body 103 when the housing 102 is pressurized.

The lower lid member 150 is formed of an outer annular section 154 integrated with an inner projecting section 156. The outer annular section 154 includes a lower or outward-facing surface 158 which is substantially parallel to a plane of the lower head opening 118, and defines a lower lid indent formed of a substantially horizontally oriented lower press section 160 which extends around an outer circumferential periphery of the outer annular section lower surface 158, and a vertically oriented lower safety ledge 161 disposed at an inner radial edge of the lower press section 160. The lower press section 160 is an outward or downward facing surface of the lower lid member 150 which is horizontally oriented. The inner projecting section 156 protrudes substantially orthogonally from the outer annular section 154 in an outward or downward direction. The inner projecting section 156 defines a line opening 159 which is disposed so as to be substantially centrally located within the lower head opening 118. The line opening 159 is defined as a substantially circular opening which communicates with an interior of the housing 102, and is threaded for engagement with the T-pipe 112, as described in further detail below. The outer annular section 154 and the inner projecting section 156 may be integrally formed such that the lower lid member 150 constitutes a single, unitary piece (as illustrated).

The lower lock member 152 is an incomplete annular or ring-shaped body provided with a handle 162. The lower lock member 152 has a generally circular base shape when viewed from below in FIG. 1. As the lower lock member 152 has an incomplete ring-shape, the lower lock member 152 may be deformed from the generally circular shape so as to facilitate releasable engagement with and disengagement from the lower head portion 108, as will be described in further detail below. In this regard, the handle 162 is provided to facilitate deformation of the lower lock member 152.

With reference to FIG. 5, a lower head indent 164 is defined in the inner surface of the lower head portion 108, in the lower head inner collar portion 108B which is overmolded with the lower head outer barrel portion 108A. The lower head indent 164 extends along an entire circumference of the inner surface of the lower head portion 108 at a generally intermediate vertical position of the lower head portion 108. An inner, vertically-oriented surface of the head indent 164 defines a diameter and circumference greater than an inner diameter and circumference of the lower head portion 108 (i.e., the lower head opening 118). A height of the lower head indent 164 is substantially equal to, or slightly greater than, a height of the lower lock member 152 such that a portion of the lower lock member 152 can be received within the lower head indent 164 so as to engage the lower lock member 152 with the lower head portion 108. It is noted that the inner collar portion 108B is formed to be stronger and/or more rigid than the outer barrel portion 108A. As such, by defining the lower head indent 164 in the inner collar portion 108B, the lower lock member 152 may engage the lower head portion 108 at a more rigid and secure portion thereof.

With further reference to the lower lock member 152, an outer circumference thereof is substantially equal to, or slightly less than, the inner circumference of the lower head indent 164 at the inner, vertically-oriented surface. Furthermore, a width of the lower lock member 152 (defined herein as a length between an outer circumferential surface and an inner circumferential surface) may be substantially equal to a sum of a width of the head indent 164 and a width of the lid indent 160.

As noted, the lower lock member 152 is configured to releasably engage the lower head portion 108. In this regard, an inner circumferential portion (inner portion) of the lower lock member 152 forms an abutment section and an outer circumferential portion (outer portion) of the lower lock member 152 is configured to engage the lower head portion 108 by being received within the lower head indent 164. The abutment section of the lower lock member 152 may be defined as the portion of the lower lock member 152 which protrudes into the lower head opening 118 from the lower head indent 164 when the lower lock member 152 engages the lower head portion 108. As will be discussed in further detail below, an inward facing portion of the abutment section of the lower lock member 152 is configured to abut the outward facing press 160 section of the lower lid member 150.

The lower closing assembly 110 closes and pressure seals the lower head opening 118 by placing the lower lid member 150 within the lower head portion 108 such that the lower lid member 150 fully covers the lower head opening 118. The lower lid member 150 may contact the tapered inner surface of the lower head portion 108 defined by the outer barrel portion 108A. In this condition, when the housing 102 is not pressurized during water filtration, the lower lid member 150 may be moved to contact the tapered inner surface of the lower head portion 108 such that the press section 160 does not press against the abutment section of the lower lock member 152 (i.e., the press section 160 may be moved to a rest height). The lower lock member 152 is then deformed and received within the lower head indent 164 (i.e., the lower lock member 152 engages the lower head portion 108) at a position adjacent to, but which may be spaced from (in the outward direction), the outward facing press section 160 of the lower lid member 150. Inasmuch as the lower head portion 108 may be a lower end of the housing 102, the lower lid member 150 may abut the lower lock member 152 due to gravity. In this way, the lower lock member 152 may set a position of the lower lid member 150 even when the housing 102 is not pressurized.

Once the system 100 is operable (i.e., water filtration begins), the pressure generated within the housing 102 during water filtration presses the lower lid member 150 outwardly (downwardly) such that the press section 160 presses the abutment section of the lower lock member 152. This pressing causes the lower lock member 152 to press into a lower surface of the lower head indent 164. The lower lid member 150 is pressed into the lower lock member 152 with a force sufficient to make disengagement of the lower lock member 152 from the lower head portion 108 extremely difficult or impossible. More particularly, the press section 160 of the lower lid member 150 is caused by pressure within the housing 102 to press the abutment section of the lower lock member 152 with a force sufficient to substantially prevent the lower lock member 152 from being deformed, and thereby preventing the lower lock member 152 from disengaging the lower head portion 108.

The lower lid member 150 is thereby made, through action of the pressure generated within the housing 102 during water filtration, to wedge the lower lock member 152 between the lower lid member 150 and the lower head indent 164 with such a force that deformation of the lower lock member 152 is made very difficult, if not impossible, for a human user (or a machine controller, if applicable). In this regard, it is noted that the lower lid member 150 may be received within the lower head portion 104 so as to be movable over a relatively small vertical range. The base positions of the lower lid member 150 and the lower lock member 152 (including the lower head indent 164) when the housing 102 is not pressurized (i.e., the rest height) are such that the outward force exerted on the lower lid member 150 as a result of internal pressures typical for the applied water filtration process is sufficient to cause the lower lid member 150 to press into the lower lock member 152 with the force sufficient to substantially prevent deformation of the lower lock member 152 (and therefore also to substantially prevent disengagement from the lower head portion 108). It is also noted that the lower lock member 152 is received in the lower head indent 164 defined in a relatively more rigid portion of the lower head portion 108, so that the lower head portion 108 is better equipped to handle the pressures exerted thereon by the lower closing assembly 108 (i.e., the lower lock member 152 via the lower lid member 150).

Furthermore, the pressure-sealed closing system may provide safety mechanisms, similar to those used with the upper closing assembly 106, to help ensure that the lower lock member 152 does not disengage from the lower head portion 104 when the housing 102 is pressurized during water filtration. In this regard, the lower handle 162 may be provided with a reduced-strength portion which is configured to fail (e.g., break or otherwise deform) upon exertion of a predetermined force on the lower handle 162. The reduced-strength portion may be formed such that the predetermined force is a force less than that required to deform and/or disengage the lower lock member 152 from the lower head portion 108 when the housing 102 is pressure sealed. Accordingly, if a force sufficient to deform the lower lock member 150 is applied to the lower handle 162 while the housing 102 is pressure sealed, the lower handle 162 will fail (e.g., break), thereby preventing deformation and/or disengagement of the lower lock member 152.

Additionally, as noted above, the lower lid member 152 is provided with the safety ledge 161, which is disposed at the inner radial edge of the press section 160. The safety ledge 161 is formed such that, when the housing 102 is pressure sealed with the press section 160 pressing against abutment section of the lower lock member 152, the safety ledge 161 prevents deformation and disengagement of the lower lock member 152. Specifically, an attempted deformation of the lower lock member 152 will cause an inner edge of the lower lock member 152 to abut against the safety ledge 161, thereby preventing further deformation of the lower lock member 152. Accordingly, even if the lower lock member 152 is forcibly moved to deform while the housing 102 is pressure sealed, the lower lock member 152 cannot be deformed and disengaged from the lower head portion 108.

To disengage the lower lock member 152 from the lower head portion 108, the housing 102 must be depressurized (i.e., by actuating the pressure release mechanism 144). Once depressurized, the lower lid member 150 may be moved within the lower head portion 108 to place the press section 160 is at the rest height. The safety ledge 161 is formed such that, when the press section 160 is at the rest height, the lower lock member 152 is not prevented from deforming or disengaging from the lower head portion 108 by the safety ledge 161. That is, the safety ledge 161 is formed to have a height such that, when the press section 160 of the lower lid member 150 is moved to the rest height, an upper/outward end of the safety ledge 161 is disposed substantially inwardly/upwardly from the abutment section of the lock member 152, so that the lower lock member 152 may be deformed without abutting or being blocked by the safety ledge 161.

Accordingly, when the system 100 is operational and the housing 102 is pressurized, deformation of the lower lock member 152 is extremely difficult or impossible, and the lower lid member 150 and the lower lock member 152 cannot be removed (i.e., the lower lid member 150 and the lower lock member 152 cooperate to pressure seal housing at the lower head opening 118). To remove the lower lock member 152, the pressure release mechanism 144 on the upper lid member 128 must be actuated to release the pressure within the housing 102. Once the pressure is released, the pressure seal is released (i.e., the pressing on the lower lock member 152 by the lower lid member 150 is relieved), and the lower lock member 152 may be deformed and removed.

With further reference to FIGS. 1 and 4, it is noted that the T-pipe 112, which includes a central line 166, a supply line 168, and a house line 170 (system output line), is provided to communicate a main water supply line (not shown) with an interior of the housing 102 and a house supply line (not shown). Particularly, the central line 166, which extends orthogonally to the supply and house lines 168, 170, is threaded along an outward surface and is sized and shaped so as to threadedly engage the line opening 159. Furthermore, a filter cartridge support plate 172 may be provided with a central, hollow section configured to communicate with an upper end of the T-pipe central line 166. The support plate 172 also includes a base section on which the filter cartridge is placed. Assuming the use of a reverse osmosis filter cartridge, the central, hollow section of the support plate 172 is concentrically provided with the inner flow channel of the filter cartridge so as to communicate the inner flow channel of the filter cartridge with the T-pipe central line 166.

Operationally, water from main water supply line enters the system 100 through the supply line 168 and central line 166 of the T-pipe 112. Once in the housing 102, the water is subjected to water filtration (e.g., reverse osmosis filtration) and passes through the cartridge inner channel to the house supply line through the central line 166 and the house line 170. In this regard, though not illustrated as such, the central line 166 may define a bifurcated flow path whereby water entering from the supply line 168 is directed into an area surrounding the filter cartridge within the housing 102 along a first central line path, while filtered water from the housing 102 is directed to the house line 170 along a second central line path. Such a T-pipe is generally known in the art, and is therefore only summarily described and illustrated herein.

The above description of the system 100 sets forth a method for pressure sealing and opening the housing 102. To restate, the upper and lower lid members 128, 150 are placed within the upper and lower head portions 104, 108 so as to fully cover the upper and lower head openings 116, 118, respectively. The upper and lower lock members 130, 152 are then deformed and received in the respective head indents 148, 164 such that portions of the lock members 130, 152 which protrude into the head openings 116, 118 abut outward facing press sections 140, 160 of the lid members 128, 150. Water filtration is then commenced by the system 100, generating a pressure within the housing 102. The pressure generated within the housing 102 presses outwardly on the upper and lower lid members 128, 150. This causes the upper and lower lid members 128, 150 to press against the respective lock members 130, 152 with a force which substantially prevents deformation of the lock members 130, 152 (and therefore also prevents disengagement of the lock members 130, 152 from the head portions 104, 108). In this state, the housing 102 is pressure sealed.

It is to be appreciated that the pressure generated within the housing 102 is generated as a result of the water filtration process. The locking seal state is achieved through action of this pressure on the lid members 128, 150, lock members 130, 152, and head indents 148, 164, all of which are arranged so as to utilize the water filtration pressure generation to achieve the pressure sealed state. In this regard, the force which substantially prevents deformation of the lock members 130, 152 is a force generated as a result of the forces typically associated with water filtration. The housing 102 and closing assemblies 106, 110 are configured and disposed so as to utilize the force from the internal pressure generated during the applied water filtration process to achieve the locking seal state.

To remove either or both of the upper and lower lid members 128, 150, the pressure release mechanism 144 is actuated to release the pressure within the housing 102. Once released, the upper and lower lock members 130, 152 may be deformed and removed. The upper and lower lid members 128, 150 are then freely removed.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

For example, the herein described system 100 is configured for point of entry in home water filtration use. However, it is to be appreciated that the herein described housing and closing assembly are equally amenable for use with other water filtration applications. Moreover, insofar as the body 103, the upper head portion 104, and the lower head portion 108 may be described as separate pieces, it is to be appreciated that these may all be contained in a single body which defines upper and lower openings.

Furthermore, while the closing assemblies are described as utilizing incomplete ring-shaped lock members received within an indent defined in head portions, any other manner of lock member configured to abut the lid members may be used. For example, a plurality of lock members may be received in a plurality of indents defined in the head portion. Alternatively, the lock members may be configured to protrude from and retract into the head portion.

Further still, it is to be appreciated that the shapes and sizes of the filter system components described herein may be varied as desired. For example, either or both of the lid members may be given any other shape, such as one which does not include an inner dome section. Moreover, the housing body need not be cylindrical, and in such applications, the shape of the lid members may be altered to match a shape of the housing body opening. The lid members are also described herein as being formed of injection molded plastic. However, the lid members may be formed of any different material suitable for this application.

It is also reiterated that the herein described housing 102 and closing assemblies 106, 110 are amenable for use with any manner of filtration process, especially those which generate an internal pressure. In this regard, various modifications may be made to certain elements to facilitate alternative water filtration methods. For example, the interior of the housing body 103 may be altered and/or provided with alternative structure to support different filter cartridges (such as a planar screen) and/or provide specific water solution movement within the housing 102. Additionally, any of the herein described elements having an inward facing portion may be equipped with a UV-emitting device. To further facilitate any manner of water filtration process, the T-pipe 112 may be replaced with any other liquid communicating device or suitable mechanism for introducing water solution into the housing 102, including those which are separate for entry and output water and are provided on different parts of the system. Additionally, the liquid communicating device(s) may be provided to the upper lid member 128, rather than (or in addition to) the lower lid member 150.

Moreover, the housing 102 may be configured as a general-use toolbox to house any manner of filtration system. In this regard, the upper and lower lid members 104, 108 may be alternately configured to include different valves or manifolds for different filtration applications. Furthermore, either or both of the upper and lower lid members 104, 108 may be provided with a general purpose opening, which may be threaded, configured to engage various valves, manifolds, and/or other members (e.g., any of several types of communicating devices and/or the pressure release mechanism 144). To facilitate the use of the housing 102 as a general-use toolbox, the body 103 may be sized to receive a variety of different water filtration components (e.g., components for different types of water filtration), and the upper and lower head openings 116, 118 may be sized for these components to be inserted into the body 103.

For example, FIG. 6A illustrates an exemplary filter cartridge 174 which is formed in a cylindrical shape. The filter cartridge 174 may include a tubular, spirally wound semi-permeable reverse osmosis membranes, as well as a handle 176 at an upper end, and a nozzle 178 at a lower end. The filter cartridge 174 is formed to fit within the housing 102. The filter cartridge 174 may take the form of any type of filter media suitably applied via the shown configuration.

The filter cartridge 174 is shown when received in the above-described housing 102 in FIG. 6B. Therein, the nozzle 178 is configured to receive two O-rings and to engage the inner projecting section 156 and/or the line opening 159 via the O-rings. In this configuration, raw water is introduced via the supply line 168 to a portion of the housing 102 between an outer surface of the filter cartridge 174 and the body 103. The raw water passes through the filter cartridge 174 to a center of the filter cartridge 174. The filtered water at the center of the filter cartridge 174 is then directed out of the housing 102 via the supply line 166 and the house line 170.

FIG. 7A illustrates an alternative filtering embodiment in which a filter casing 180 is used. The filter casing 180 has a substantially cylindrical shape and is sized to fit within the housing 102. The filter casing 180 includes a lid 181 with a handle 182 at an upper end thereof, a nozzle 184 at a lower end thereof, and a midplate 186 separating an interior of the filter casing 180 into two compartments. The lid 181 and the filter casing 180 may be configured to threadedly engage one another such that the lid 181 closes an upper end of the filter casing 180. The midplate 186 may be formed as described in, e.g., U.S. patent application Ser. No. 11/834,151, filed Aug. 6, 2007 and Ser. No. 12/825,982, filed Jun. 29, 2010.

As shown in FIG. 7B, the filter casing 180 is received in the housing 102 in a similar manner to the filter cartridge 174 (i.e., the nozzle 184 receives O-rings and engages the inner projecting section 156 and/or the line opening 159 via the O-rings). Raw water introduced directly into the housing 102 may be introduced directly into the filter casing 180, or may be introduced to enter the filter casing 180 via the lid 181. In this regard, the lid 181 may be formed to allow raw water to enter the filter casing 180. Any type of filter media may be provided within the filter casing 180. The use of the filter casing 180 standardizes a size and shape of a filter media used with the housing 102, and allows for ready disposal of filter media when desired (e.g., arsenic filtration).

Figure 8:
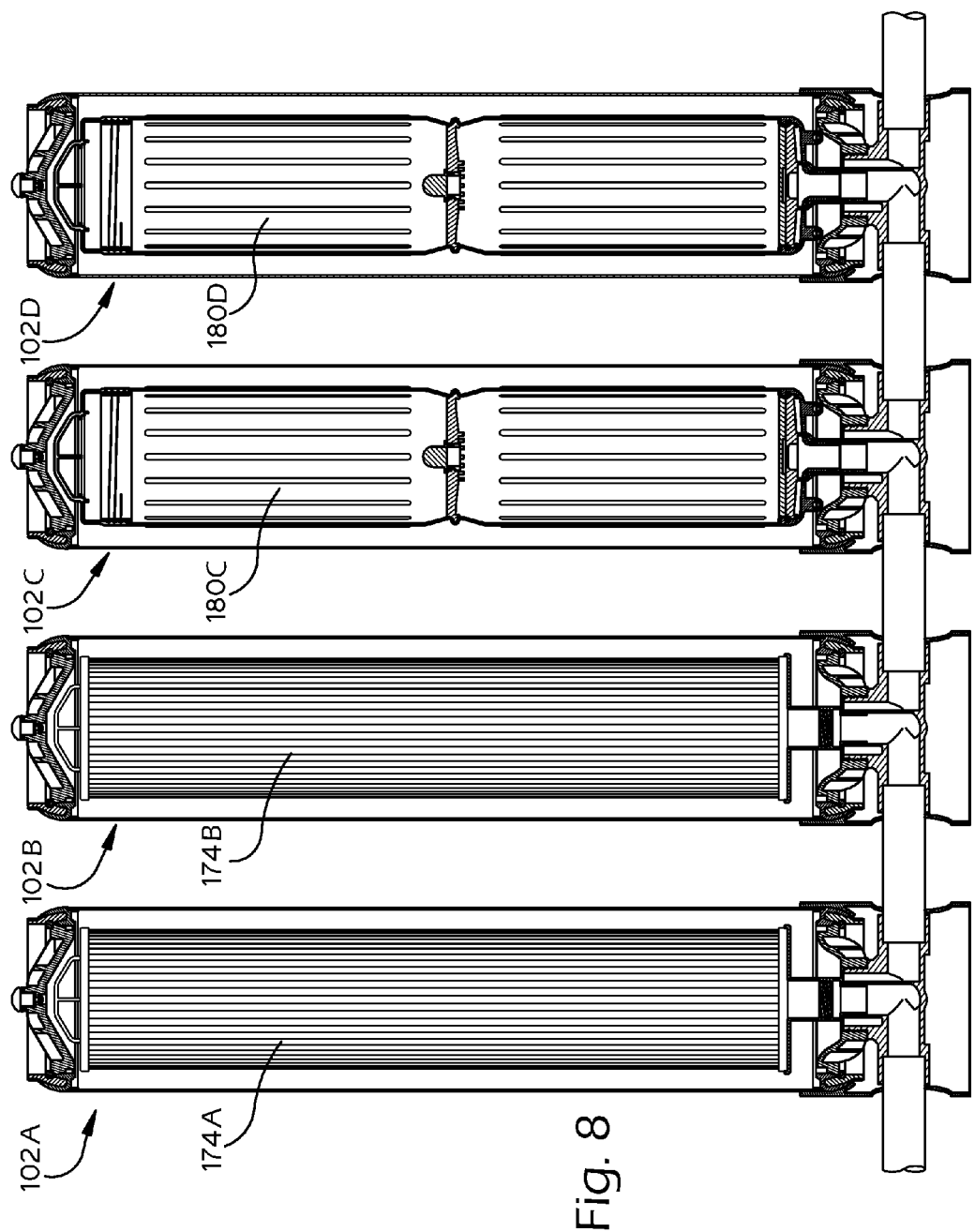
FIG. 8 is a sectional view illustrating an exemplary multi-filtration-method water filtration system according to the instant disclosure.

Additionally, certain filtration applications may benefit from the provision of several housings, with each housing configured to perform one type or level of filtration (i.e., multi-filtration-method water filtration systems). In such an application, each of several housings 102 may be provided to serially communicate with one another, such that the filtered output from one housing is directed to the next. Such is easily accomplished by connecting the house line 170 from one housing 102 to the supply line 168 of another. This multi-filtration-method water filtration system is shown in FIG. 8, wherein a first housing 102A, a second housing 102B, a third housing 102C, and a fourth housing 102D are each identical and provided with a different type of filter cartridge 174A, 174B, respectively, or filter casing 180C, 180D and connected to serially filter raw water.

Job site assembly is further simplified due to the housing being configured for general use. Several housings and closing assemblies may be brought to the job site along with the necessary components for the various types of water filtration to be carried out. Each of the housings and filtration systems may then be assembled on the job site, with each of the housings being connected to one another to assemble a serial filtration system. As noted above, each of the housings (with respective closing assemblies) is configured to receive and hold a variety of different types of filtration components, and the lid members are configured to operate with different valves, manifolds, etc. Accordingly, rather than having to pre-assemble each filtration system, the components may be brought and assembled on site using the general-use housing described herein. Moreover, storage of various housing, filter cartridges/casings, lid members, etc. is eased due to each component being commonly used for various filtration methods.

It is further noted that the housing 102 may be formed to have a midplate, such as midplate 186, which separates an interior of the housing 102 into two (or more) compartments. In such an embodiment, the midplate may be joined with the body 103, and the filter cartridge 174 may be made to fit into each compartment of the housing 102. Accordingly, more than one type of filter cartridge 174 may be applied.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:
1. A water filtration system comprising:
  a housing comprising:
    a hollow body formed of a polymeric material;
    an upper head having an inner surface which defines an upper head opening, the upper head being joined to an upper end of the hollow body such that the upper head opening communicates with an interior of the hollow body;
    a lower head having an inner surface which defines a lower head opening, the lower head being joined to a lower end of the hollow body such that the lower head opening communicates with the interior of the hollow body;

an upper lid removably received by the upper head to cover the upper head opening;

a lower lid removably received by the lower head, the lower lid including an inner projecting section that projects toward the interior of the hollow body;

a filter casing removably received within the hollow body, the filter casing including a lid at an upper end and a nozzle at a lower end;

wherein the upper head and the lower head are each formed of a thermoplastic outer barrel portion and a reinforced polymer inner barrel portion, wherein the outer barrel portion at least partially covers an outer side of the inner barrel portion, wherein the inner barrel portion is formed of a more rigid material than the outer barrel portion, wherein the outer barrel portion includes a bulbous proximal section having an end that is attached to the hollow body, and a distal section spaced from the bulbous proximal section along a taper such that the distal section defines an outer diameter less than that of the proximal section, and wherein the upper head, the lower head and the hollow body are overwrapped with reinforcing filaments, and the taper on each of the upper head and lower head provides mechanical gripping surfaces for the filaments.

2. The water filtration system according to claim 1, wherein the lid of the filter casing includes a handle.

3. The water filtration system according to claim 1, wherein the lid of the filter casing is threadedly joined to the upper end.

4. The water filtration system according to claim 1, wherein the filter casing includes a midplate that separates an interior of the filter casing into an upper compartment and a lower compartment.

5. The water filtration system according to claim 4, wherein the upper compartment contains a first media and the lower compartment contains a second media.

6. The water filtration system according to claim 5, wherein the first media and the second media are different.

7. The water filtration system according to claim 5, wherein the first media and the second media are identical.

8. The water filtration system according to claim 1, wherein an outer side of the nozzle is provided with O-rings.

9. The water filtration system according to claim 8, wherein the O-rings sealingly engage the inner projecting section of the lower lid.

10. The water filtration system according to claim 1, wherein the upper head opening is large enough to accommodate insertion of the filter casing into the interior of the hollow body when the upper lid is removed from the upper head.

11. A method for servicing a water filtration system according to claim 1, the method comprising:

removing the upper lid from the upper head;

removing the filter casing from the interior of the hollow body through the upper head opening;

inserting a replacement filter casing into the interior of the hollow body through the upper head opening; and covering the upper head opening with the upper lid.

12. The method according to claim 11, wherein the lid of the filter casing includes a handle, and wherein the filter casing is removed from the interior of the hollow body through the upper head opening by pulling on the handle.

13. The method according to claim 11, wherein the lid of the filter casing is provided with threads and the upper end of the filter casing is provided with threads, and wherein the method further comprises threadedly joining the lid of the filter casing to the upper end of the filter casing.

14. The method according to claim 11, wherein the filter casing includes a midplate that separates an interior of the filter casing into an upper compartment and a lower compartment, and wherein the method further comprises disposing a first media into the upper compartment and a second media into the lower compartment.

15. The method according to claim 14, wherein the first media and the second media are different.

16. The method according to claim 14, wherein the first media and the second media are identical.

17. The method according to claim 11, wherein an outer side of the nozzle is provided with O-rings, and the method further comprises sealingly engaging the O-rings with the inner projecting section of the lower lid during the inserting step.

* * * * *